INVENTOR
LEWIS C. HOFFMAN

May 28, 1968    L. C. HOFFMAN    3,385,799
METALIZING COMPOSITIONS

Filed Nov. 9, 1965    2 Sheets-Sheet 2

INVENTOR
LEWIS C. HOFFMAN,

BY Robert J. Smith

ATTORNEY

United States Patent Office 3,385,799
Patented May 28, 1968

3,385,799
METALIZING COMPOSITIONS
Lewis C. Hoffman, Wilmington, Del., assignor to E. I. du Pont de Nemours and Company, Wilmington, Del., a corporation of Delaware
Continuation-in-part of application Ser. No. 258,606, Feb. 14, 1963. This application Nov. 9, 1965, Ser. No. 506,986
12 Claims. (Cl. 252—514)

This invention is a continuation-in-part of my copending application, Ser. No. 258,606, filed Feb. 14, 1963.

This invention relates to metalizing compositions useful for the forming of electrically conductive paths, electrically resistive paths and capacitor electrodes on electrically insulative and/or dielectric substrates. The metalizing compositions of this invention are characterized in that they provide for the production of electric elements having mechanical and electrical properties not heretofore attained.

Metalizing compositions used with prefired ceramic substrates to form electrical elements customarily contain powdered vitreous binder, finely divided noble metal particles and an inert vehicle. A major purpose of the vitreous binder is to secure the noble metal particles to the ceramic substrate. To provide this function, a firing temperature must be employed which causes the vitreous binder to soften and wet the ceramic substrate. It has been observed that higher adhesive values can be obtained with higher firing temperatures. However, when temperatures equal to or in excess of the melting point of the noble metal particles of the metalizing composition are used for firing, the metal particles draw back into globules forming non-continuous fired-on coatings and defective electrical elements. To avoid the formation of these undesired metal globules while using metalizing compositions containing the more abundant and less expensive noble metals such as gold and silver which melt at 1062° C. and 960° C. repsectively, vitreous binders which melt below these temperatures are used. The industry has recently demanded electrical elements which cannot be produced using these prior art materials.

Capacitors fabricated with ceramic dielectric layers are customarily produced by spraying slurries of the finely divided ceramic dielectric onto a base surface, drying the same, and then superimposing thereon a finely divided noble metal, e.g., silver, in a vehicle, in paste form. This is usually done by screen-stenciling the silver paste onto the dielectric layer in a desired pattern, later to serve as the capacitor electrode. As many as 40 alternate layers of ceramic dielectric and silver electrodes may be built in this manner, for example, as shown in U.S. Patents Nos. 2,389,420 and 2,389,176. The so-formed composite structure is then fired at the fusing temperature of the ceramic to form an electrical capacitor unit. With glass ceramic dielectric the fusing temperature of the dielectric layer is of the order of 700° C. to 800° C. and silver is a suitable and desirable electrode material since such firing temperature is below the melting point of silver.

The industry has more recently demanded a dielectric material having a higher dielectric constant than that of glass ceramic. It has become necessary to form the dielectric of a material having a much higher fusing temperature than that of glass. Substances such as barium or strontium titanate or titanium dioxide, having a sintering temperature of over 1350° C. are necessary for this purpose. With such dielectrics, neither finely divided silver nor gold can be used since at fusing temperatures of over 1200° C., silver and gold draw into fine globules and produce non-continuous electrode layers. This means that the electrode screen-stencil paste for use with these materials has necessarily been composed of metal powders of platinum, palladium or similarly expensive noble metals, the only materials heretofore available.

It is an object of this invention to provide metalizing compositions which will enable the production of electrical elements having mechanical and electrical qualities superior to those heretofore produced.

It is a further object of this invention to provide metalizing compositions which can be fired to higher temperatures than can prior art metalizing compositions of similar cost.

It is a further object of this invention to provide metalizing compositions which will enable the use of high sintering temperature dielectric material.

It is a further object of this invention to provide new and improved metalizing compositions for use in producing ceramic fired capacitors in which the ceramic material has a high fusing temperature, i.e., a fusing temperature over 1200° C.

It is a still further object of this invention to provide metalizing compositions comprising powdered vitreous binders which, by reason of their high sintering temperatures, could not be used with metalizing compositions containing particles of pure silver and/or pure gold.

These and other objects will occur to those skilled in the art reading the following detailed disclosure.

The objects of the invention may be accomplished, in general, by providing metalizing compositions which contain powders of noble metal alloys which consist essentially of two noble metals selected from the group consisting of gold, silver, platinum and palladium. Specifically, the alloy powders of the metalizing compositions of this invention are silver-gold, silver-platinum, silver-palladium, gold-platinum, gold-palladium and platinum-palladium alloys. The alloy metals in the metalizing compositions of this invention are characterized in that the metal components thereof form continuous series of solid solutions throughout the entire range of alloy compositions without the formation of compounds or eutectics.

The noble metal component of the metalizing composition of this invention will be in finely divided form, i.e., a powder sufficiently finely divided to pass through a 325 mesh (U.S. Standard Sieve Scale) stencil screen. Generally, the powder will have an average particle size not exceeding 40 microns with no more than 5% of the particles being larger than 42 microns. Desirably, the average particle size will not exceed about 5 microns and, preferably, will be in the range 0.1 to 0.5 micron. The most preferred powders will be essentially free of particles of a size greater than about 5 microns; with an average particle size in the range 0.1 to 0.5 micron.

In preparing the metalizing compositions of this invention, the alloy powders prepared by the method disclosed in my copending application, Ser. No. 507,038, filed of even date herewith can be used. The method of the said copending application is the only practical way known to applicant for preparing these alloy powders. By this method, the alloy powder is precipitated from a solution of dissolved compounds of the metal constituents of the alloy to be formed by adding thereto a reducing agent which will simultaneously reduce both metal constituents of the alloy to their metals and coprecipitate the desired alloy particles.

The following examples are given to illustrate in detail the method of preparing alloy particles in accordance with the teachings of said application, Ser. No. 507,038; it being understood that these details are not to be taken as limitations of this invention.

*Example 1*

To obtain a 90% gold-10% platinum alloy, 24 grams of a PtCl$_4$ solution containing 32.67% platinum by analysis were mixed with 176 grams of an $AuCl_3$ solution containing 39.09% gold. The resulting solution was diluted to 2500 ml. and a solution of 50 grams of hydrazine hydrate in 1000 ml. of deionized water was dropped in with rapid stirring. A black precipitate of the gold and platinum alloy formed which was allowed to settle, washed with water by decantation, filtered off and dried. The observed melting point of this precipitate was 1080° C. which coincided with the theoretical melting point of a 90% gold-10% platinum alloy as obtained from the literature. The average particle size of this precipitate powder was 0.3 micron.

*Example 2*

15 grams of a $PdCl_2$ solution containing 26% palladium by analysis were mixed with 85 grams of an $AuCl_3$ solution containing 39.08% gold so that the weight of palladium in the resulting solution equalled 10% of the total weight of palladium and gold. The resulting solution was diluted to 250 ml. and a solution of 4 grams of hydrazine hydrate in 100 ml. of deionized water was dropped in with rapid stirring. A black precipitate of the gold-palladium alloy formed which was allowed to settle, washed with water by decantation, filtered off and dried. The melting point of this precipitate was observed to be 1175° C. which differed from the theoretical melting point of a 90% gold-10% palladium alloy by only 25° C. The observed melting point was 113° C. above the melting point of gold.

*Example 3*

310 grams of palladium sponge are dissolved in 5 liters of red, fuming nitric acid (Sp. gr. 1.53 g./cc.) at 50–60° C. The solution is allowed to cool. 77.5 grams of silver are then dissolved in the solution to give an 80/20 weight ratio of Pd/Ag in the solution. 7.1 liters of concentrated ammonium hydroxide (Sp. gr. 0.9) are then slowly dropped into the solution changing the solution from brown through red and yellow to yellow-green. The pH of the solution is about 5.5.

1 liter of 50% $H_3PO_2$ solution is next slowly dropped into the above solution. A black precipitate forms and settles to the bottom of the reaction vessel. The precipitate is filtered off and dried, yielding 386.5 grams of alloy powder.

The powder has a melting point of about 1400° C., showing that it is an alloy of Pd and Ag rather than a mixture of the two. The average particle size of this powder is about 0.4 micron.

By varying the relaive amounts of the solutions of the metal compounds used in Examples 1, 2 and 3 above, alloy particles were prepared by the method of these examples having metal ratios which differed from the metal ratios of the alloys of Examples 1, 2 and 3. For further details regarding the materials used and the method of making these alloy powders, reference can be made to my copending application, Ser. No. 507,038.

Tables I and II set forth below the particle size distributions of the powders of Examples 1 and 2 respectively. The powders of these two examples have average particle sizes and particle size distributions which are typical of the alloy powders made in accordance with the method of my copending application, Ser. No. 507,038. These particle size analyses were obtained by microscopic study of enlarged electron photomicrographs of the respective powders.

TABLE I.—GOLD-PLATINUM ALLOY POWDER

| Particle size range: | Percentage of particles within indicated size range |
|---|---|
| 0–0.1 micron | 2 |
| 2.0–5.0 microns | 4 |
| 0.1–1.0 micron | 80 } 90 |
| 1.0–2.0 microns | 10 |
| 5.0–10.0 microns | 3 |
| Greater than 10.0 microns | 1 |

The average particle size was 0.3 micron.

TABLE II.—GOLD-PALLADIUM ALLOY POWDER

| Particle size range: | Percentage of particles within indicated size range |
|---|---|
| 0–0.1 micron | None |
| 0.1–1.0 micron | 75 } 90 |
| 1.0–2.0 microns | 15 |
| 2.0–5.0 microns | 4 |
| 5.0–10.0 microns | 4 |
| Greater than 10.0 microns | 2 |

The average particle size was 0.2 micron.

These alloy powders are characterized in being irregularly shaped, and having a small average size resulting in a high surface area to mass ratio and excellent conductive properties. The particles of the powders, most importantly the surface portions thereof, consist of homogeneous mixtures of the atoms of the alloy metals. By reason of the fact that 90% by count of the particles are within a close, small size range, between 0.1 and 5.0 microns, setting and vertial classification of the particles during application and firing of the metalizing compositions are reduced. More uniform, high quality fired-on coatings can accordingly be produced with the metal powders of this invention. Average particle sizes of about 40 microns and smaller are necessary to enable screen printing through 325 mesh screens.

To illustrate the distinguishing features of this invention, the results of an attempt to produce an alloy powder acceptable for use in metallizing compositions by a technique presently known to the metalizing industry is here reported. An alloy powder consisting of platinum and gold which was comminuted from a thermally prepared alloy button of these metals, most closely approached the desired properties necessary in an alloy power which is to be used in a metalizing compound. The average particle size and particle size distribution of this alloy powder are set forth in Table III hereinafter. The size distribution was determined by the same microscopic analysis which was used to obtain the data in Tables I and II above.

TABLE III.—GOLD-PLATINUM ALLOY (MECHANICALLY COMMINUTED)

| Particle size range: | Percentage of particles within indicated size range |
|---|---|
| 0–10 microns | None |
| 10–20 microns | 1 |
| 20–30 microns | 1 |
| 30–40 microns | 1 |
| 40–50 microns | 7 |
| 50–60 microns | 30 |
| 60–70 microns | 40 |
| Greater than 100 microns | 20 |

The average particle size was 62 microns.

The gross inadequacy of this mechanically comminuted powder was demonstrated by its lack of plasticity when mixed with a typical vehicle (8% solution of ethylcellulose in beta-terpineol), and its inability to pass through the fine 200–325 mesh screens used in screen-stencilling.

In addition to the metal alloy powders, the metalizing compositions of this invention comprise an inert vehicle. Any inert liquid may be employed for this purpose. Preferably an organic solvent with or without thickening agents, stabilizing agents or the like is used as the vehicle. For example, methyl, ethyl, propyl, butyl or higher alcohols, the corresponding esters of such alcohols such as their acetates, propionates, etc., the terpenes and liquid resins, for example, pine oil, alpha-terpineol, beta-terpinelo and the like and other inert liquids may be used, the function of the liquid being mainly to form a liquid or paste of the desired viscosity for application purposes. The vehicles may contain or be composed of volatile liquid to promote fast drying after application, or they may contain waxes, thermoplastic resins or wax-like materials which are solid at room temperature but thermofluid by nature, whereby the metalizing compositions may be applied at an elevated temperature to set immediately upon contact with the cooler substrate to which they are applied.

As thickening agents, polymers such as methacrylate and butylmethacrylate resins, ethylcellulose and the like may be employed. Of the many vehicles usable in this invention, an 8% solution of ethylcellose in beta-terpineol and a 10% solution of ethylcellulose in butyl Cellosolve acetate are preferred. Butyl Cellosolve acetate is the monobutyl ether monoacetate of ethylene glycol, whose formula is $C_4H_9 \cdot O \cdot CH_2OOCCH_3$.

While metalizing compositions which are applied to green (unfired) dielectric substrates customarily consist essentially of metal powder and a vehicle, the metalizing compositions which are applied to perified ceramic substrates contain a vitreous binder in addition to the metal powder and inert vehicle. Metalizing compositions containing vitreous binders are most suitable for the formation of conductive and resistive paths of ceramic substrates. The viterous binders used in the metalizing compositions of this invention can be composed of any glass or ceramic material which will melt at a temperature lower than the melting point of the alloy powder with which it is used and which will adhere well to the substrate onto which the metalizing composition is applied. The high melting point alloy powders used in the metalizing compositions of this invention will enable the metalizing compositions to be fired to higher temperatures than those which can be used with mixtures of pure metal particles of the two constituents of the corresponding alloys. It has been observed that greater adhesion to the substrate can be achieved with the higher firing temperatures which are made possible for the use of alloy powders.

Typical vitreous binders usable in the metalizing compositions of this invention are lead, cadmium, barium, calcium, or other borate or borosilicate glass frits.

The vitreous binders used in the metalizing compositions of this invention may be composed only of frit or may in addition include zinc oxide, magnesium oxide, bismuth oxide or lead oxide. It has been found that the addition of bismuth oxide to frit will permit improved solderability and resistance properties of conductor compositions. Moreover, such addition will permit much greater variation of firing conditions and temperatures without altering metalizing properties.

The preparation of such frits is well known and consists, for example, in melting together batch ingredients which will yield the desired oxides under the fusing conditions of frit production, i.e., boric oxide can be obtained from boric acid, silicon dioxide can be produced from flint, lead oxide can be produced from red lead or white lead, barium oxide can be produced from barium carbonate, etc., and pouring the molten composition into water to form the frit. The coarse frit produced in this manner is preferably milled for 2 to 20 hours, for example, in a ball mill with water until it has been reduced to a size approximately the same as the alloy powder with which it is to be used, i.e., to a powder having an average particle size of from 3 to 30 microns and preferably from 10 to 20 microns.

In formulating vitreous binders which consist of cadmium borate frit and bismuth oxide, ratios of these materials within the range of 0.5 to 10 parts of cadmium borate frit for every 2 to 15 parts of bismuth oxide are recommended. The cadmium borate frit may be prepared by melting together mixtures of cadmium oxide and boric acid, where the amount of cadmium oxide constitutes from 75 to 95% of the total amount of material present. Preferably, the metalizing compositions of this invention include as the vitreous binder component, cadmium borate frit and bismuth oxide in the preferred ratio of 2.24 parts of cadmium borate frit and 8.96 parts of bismuth oxide with cadmium borate frit consisting of 79 parts of cadmium oxide and 21 parts of boron oxide. This preferred vitreous binder in used in the metalizing compositions in a number of the examples set forth hereinafter.

Other frits which can be used as the vitreous binder component are set forth in Table IV below.

TABLE IV

| Metal Oxides | Percent of Metal Oxide Present | | | | |
| --- | --- | --- | --- | --- | --- |
| | 1 | 2 | 3 | 4 | 5 |
| PbO | 83 | 79.6 | 68.6 | 65 | 45 |
| B₂O₃ | 17 | 10.5 | 19.7 |  | 20 |
| SiO₂ |  | 9.9 | 11.7 | 35 | 15 |
| ZnO |  |  |  |  | 20 |

Still another vitreous binder usable in conjunction with the alloy powders of this invention consists essentially of 3.9 parts of CaO, 0.8 part BaO, 27.7 parts ZnO, 21.7 parts of SiO₂, 26.7 parts of B₂O₃, 8.7 parts of Na₂O, 0.7 part of PbO, 5.8 parts of Al₂O₃ and 4.0 parts of Zr₂O. This binder is especially suited for use in metalizing compositions for the printing of resistive paths.

The metalizing compositions of this invention can be used with presently available substrates including those composed of forsterite, steatite, titanium dioxide, barium titanate, alumina or zircon porcelain. To demonstrate the invention, metalizing compositions have been applied to alumina substrates, known commercially as "AlSiMag" 614.

Metalizing compositions of this invention which are to be used to form capacitors, resistors and conductors which are not to be soldered may include noble metal aalloy particles containing 5% to 95% of either metal. Metalizing compositions which are to be used in the formation of conductors which are to be soldered should not contain alloy particles in which the ratio of metals results in non-solderability. Generally, the content of one of the metals in the alloy should be within the range of from about 12.5% to 87.5%. Platinum should not be present in the alloy in amounts greater than 85% or less than about 15% when alloyed with silver or gold or less than about 10% when alloyed with palladium. Palladium should be present in alloys of gold or silver in amounts within the range of 10 to 85%. Alloyed with gold, the amount of silver present in the alloy should be within the range of 15 to 85%.

When vitreous binders are present in metalizing compositions, they should always be present in sufficient quantities to provide adequate adhesion, for example, in amounts equal to or in excess of 2.5% of the combined amount of alloy powder and vitreous binder, also known as the solids content of the metalizing composition. The amount of vitreous binder present can constitute as high as 95% of the solids content of the metalizing composition. Metalizing compositions of this invention wherein the vitreous binders constitute from 20% to 30% of the solids content may be used to form large cross-sectional, conductive paths or thin cross-sectional resistive paths. In metalizing compositions to be used in the formation of solderable conductors the percentage of vitreous binder in the solids content of the compositions should be within the range of 5% to 30% for all platinum alloys, within the range of 5% to 25% for the gold-palladium alloy, and within the range of 5% to 20% for silver-gold and silver-palladium alloys.

The amount of inert vehicle present in the metalizing compositions can vary widely depending, to a large extent, on the method of application, percentage values within the range of 10 to 70 have been satisfactory in applying the metalizing compositions of this invention.

Figure 3:
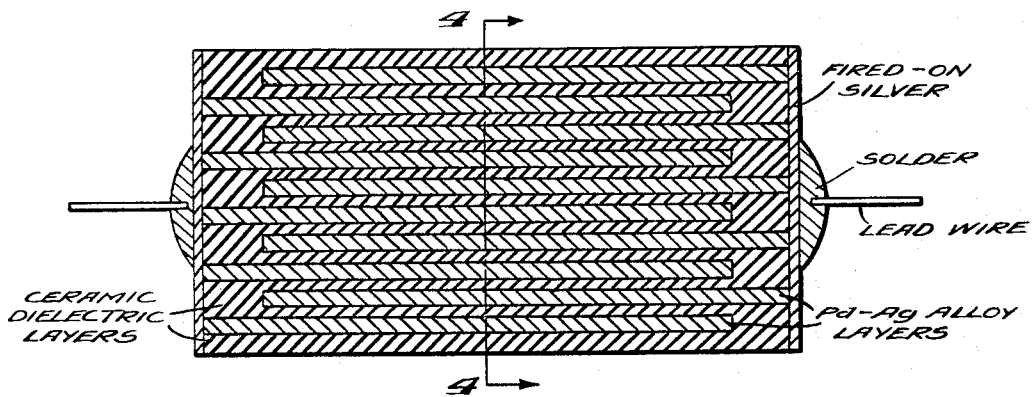

FIGURE 3 of the drawing shows a section in elevation of a capacitor which can be made in accordance with this invention.

Figure 4:
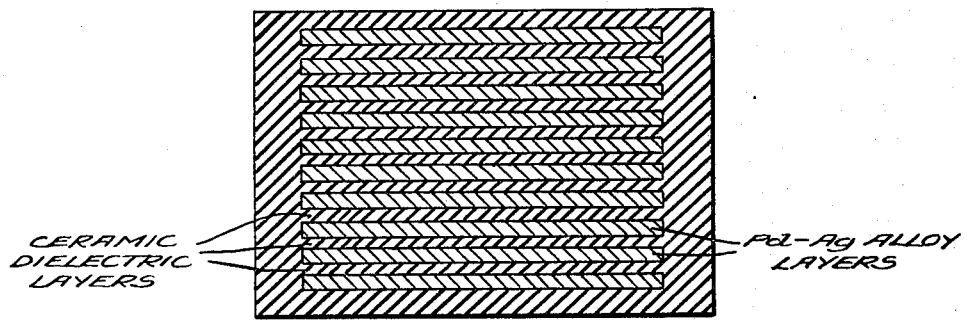

FIGURE 4 shows a cross-section view of the capacitor of FIGURE 3 taken along the line of 4—4 of FIGURE 3.

To demonstrate the present invention, a plurality of metalizing compositions were prepared using as the vehicle an 8% solution of ethylcellulose in beta-terpineol, and the preferred vitreous binder consisting of cadmium borate frit and bismuth oxide. Metal alloy powders of gold and platinum wherein the percentage of platinum present was 10%, 21.4%, 30%, 50%, 60%, 70%, 80% and 90% and metal alloy powders of gold and palladium wherein the percentage of palladium present was 10%, 20%, 30%, 40%, 50%, 60%, 70%, 80% and 90%, were prepared and combined with the preferred vitreous binder and vehicle. The resulting metalizing compositions consisted of 67% solids and 33% organic vehicle. Different ratios of metal alloy powder to vitreous binder were used to form the solids component of the metalizing composition with the metal alloy powder percentages of the solids being 5%, 10%, 20%, 30%, 40%, 60%, 65%, 70%, 75%, 80%, 85%, 90% and 95%.

Since the mechanically comminuted metal alloy of Table III could not be screen printed, noble metal powders consisting of mixtures of pure gold particles and pure platinum particles, and noble metal powders consisting of pure gold particles and pure palladium particles were prepared and were mixed with the preferred binder and vehicle all in the same proportions as were the components of the metalizing compositions which contained the noble metal alloy powders. All of these metalizing compositions were screen-stencilled onto alumina substrates ("AlSiMag" 614), were fired and dip-soldered as is well known in the metalizing art to form electrical elements. To provide as fair a basis of comparison as possible, all of the metalizing compositions were fired for two minutes at the same temperature, namely 1050° C., the highest temperature at which the powders containing pure gold particles could be fired. Solderability was initially determined by optical examination after dipping into a 67/33 Sn-Pb solder at 200–210° C. for approximately 60 seconds. Adhesion and solderability were determined by soldering on a 0.025 inch tinned copper connecting wire and pulling off the wire with an Instron tester in "peel." The tested sample was then observed to determine whether the failure occurred in adhesion at the conductive layer-alumina interface or in solderability at the wire-conductive layer joint.

Figure 1:
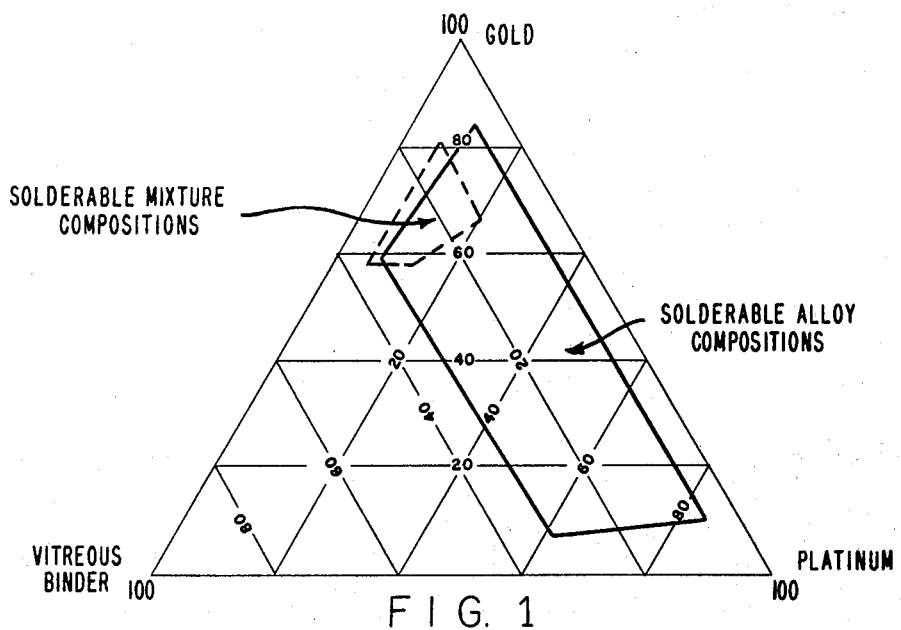
FIGURE 1 is a three-component diagram of gold, platinum and vitreous binder and illustrates the solderable mixtures of pure gold particles, pure platinum particles and vitreous binders as well as the solderable mixtures of gold-platinum alloy powder and vitreous binder.
Figure 2:
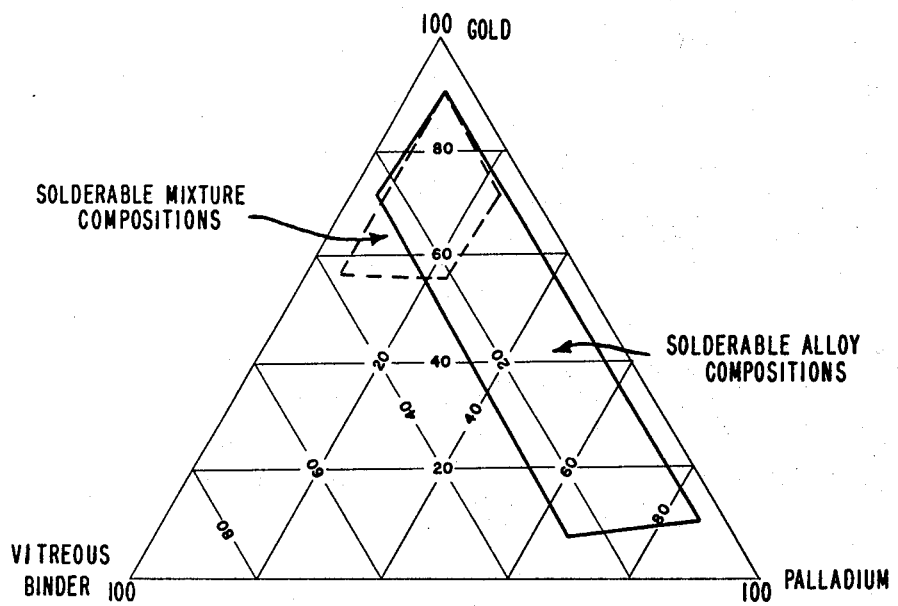
FIGURE 2 is a three-component diagram of gold, palladium and vitreous binder and illustrates the solderable mixtures of pure gold particles, pure palladium particles and vitreous binders as well as the solderable mixtures of gold-palladium alloy powder and vitreous binder.

The areas in FIGURES 1 and 2 labeled "solderable mixture compositions" and "solderable alloy compositions" contain all those metalizing compositions which had acceptable adhesive, solderability and conductive characteristics. The bond of the metalizing composition to the alumina substrate and the bond of the copper lead to the conductive layer each withstood "peel" tensions of 750 p.s.i. None of the samples fired at 1050° C. successfully withstood "peel" tensions in excess of 2,200 p.s.i. It can be seen from a mere inspection of these FIGURES that a greater lattitude of metalizing compositions is made available through the use of alloy powders. Metalizing compositions comprising alloy powders having vitreous binder contents greater than those falling within the indicated area of solderable alloy compositions did not possess acceptable solderability qualities. Metalizing compositions having concentrations of platinum and palladium greater than those falling within the indicated area of solderable alloy compositions also tended to result in non-solderability. Concentrations of gold in excess of the concentrations which lie within the solderable composition area tend to result in too rapid solubility of the metal particles in the solder bath with resulting failure to solder. It was observed that vitreous binder concentrations less than the amounts in the "solderable alloy compositions" area gave inferior adhesion.

Additional tests were performed wherein the metalizing compositions containing alloy powders were heated to temperatures just below those temperatures at which the alloy powders would have melted and formed globules. The adhesive and solderability properties observed were better than those obtained when firing at 1050° C. Two examples of these tests are set forth hereinafter.

*Example 4*

A metalizing composition consisting of 90 parts of a gold-platinum alloy containing 25% platinum, 10 parts of the preferred vitreous binder and 50 parts of an 8% solution of ethylcellulose in beta-terpineol was prepared, screen-stencilled onto an alumina substrate, fired and dip-soldered. A tinned copper conductor was soldered thereto and tested with an Instron tester. The procedure followed was the same as that employed in obtaining the data reported in FIGURES 1 and 2 with the exception that the metalizing composition was fired at 1150° C. The Instron tester read 3,750 p.s.i. prior to failure.

*Example 5*

A metalizing composition consisting of 90 parts of a gold-palladium alloy containing 25% palladium, 10 parts of the preferred vitreous binder and 50 parts of an 8% solution of ethylcellulose in beta-terpineol was prepared, screen-stencilled onto an alumina substrate, fired and dip-soldered. A tinned copper conductor was soldered thereto and tested with an Instron tester. The procedure followed was the same as that employed in obtaining the data reported in FIGURES 1 and 2 with the exception that the metal composition was fired at 1375° C. The Instron tester read 3,750 p.s.i. prior to failure.

Metalizing compositions comprising gold alloys of platinum and palladium containing the preferred vitreous binder and organic vehicle have been found to provide excellent results when the constituents of the composition are present within the range of 63% to 80% alloy powder, 0.5% to 10% cadmium borate frit, 2% to 15% bismuth oxide and 5% to 35% of a vehicle consisting of an 8% solution of ethylcellulose in beta-terpineol. Of the compositions contained within this range those compositions which exhibit the most desirable electrical and mechanical characteristics are grouped around the metalizing composition having 70.20% alloy powder, 2.24% cadmium borate frit, 8.96% bismuth oxide and 18.60% vehicle consisting of an 8% solution of ethylcellulose in beta-terpineol.

The metalizing compositions to be used in the printing of conductive circuit paths which need not be soldered can have a ratio of noble metal alloy to vitreous binder varied beyond the limits of the solderable alloy compositions area depicted in FIGURES 1 and 2. The amount of vitreous binder employed must, however, be maintained at a level which will provide adequate adhesion, i.e., above about 2.5% of the solids of the metalizing composition. To provide adequate electrical conductivity the percentage of vitreous binder in the solid content of the metalizing composition should not exceed about 30%. The precentages of one of the metals present in the metal alloy can range from about 5% to 95%.

The metal alloy powders used in the compositions of this invention having one metal component thereof present in the alloy in the amount of from 5% to 95%, in addition to being used to form conductors, can also be used with vitreous binders to form resistors. Metalizing compositions having vitreous binder to metal alloy ratios in the range of from 95:5 to 20:80 have been found satisfactory, and provide a wide range of resistive values.

Examples of different materials and amounts thereof used in the formation of resistor metalizing compositions are set forth below.

*Example 6*

2.3 parts of a 64.5% Ag solution prepared by dissolving silver nitrate crystals in water were mixed with 3.6 parts of a 46.3% Pd solution, prepared by dissolving palladium nitrate crystals in water, the volume thereof was adjusted to 100 cc. A solution of 10 grams of hypophosphorous acid in 100 ml. of water was used to precipitate an alloy powder of 50% Ag and 50% Pd which was mixed with a frit having the composition 3.9 parts of CaO, 0.8 part of BaO, 27.7 parts of ZnO, 21.7 parts of $SiO_2$, 26.7 parts of $B_2O_3$, 8.7 parts of $Na_2O$, 0.7 part of PbO, 5.8 parts of $Al_2O_3$ and 4.0 parts of $ZrO_2$, in the ratio of 40 parts of alloy powder to 60 parts of frit. 70 parts of the above mixture of frit and alloy powder were mixed with 30 parts of an 8% solution of ethylcellulose in beta-terpineol.

*Example 7*

40 parts of the gold-platinum alloy powder consisting of 80% platinum, made in accordance with the procedure of Example 1, but using 168 grams of the platinum solution and 32 grams of the gold solution, were mixed with 60 parts of the frit used in Example 6. 70 parts of the resulting mixture of alloy powder and frit were mixed with 30 parts of an 8% solution of ethylcellulose in beta-terpineol, to provide a metalizing composition for the printing of resistive paths.

*Example 8*

40 parts of the gold-palladium alloy consisting of 80% palladium, prepared in accordance with the procedure of Example 2, but using 87 grams of palladium solution and 13 grams of the gold solution, were mixed with 60 parts of the frit used in Example 6. 70 parts of the resulting mixture of frit and alloy powder were mixed with 30 parts of an 8% solution of ethylcellulose in beta-terpineol, to provide a metalizing composition for the printing of resistive paths.

Metalizing compositions useful for application to unfired dielectric layers to provide capacitors consist essentially of noble metal alloy powders and inert vehicles. Vitreous binders are not required and generally not used. Examples of this aspect of the invention are set forth below.

*Example 9*

The silver-palladium alloy powder of Example 3 above, was dispersed by hand mixing in a vehicle consisting of a 10% solution of ethylcellulose in butyl Cellosolve acetate to give a screen-stencil paste consisting of 50% by weight metal alloy powder and 50% by weight vehicle.

This paste was screened onto a 0.0025 inch thick unfired layer of barium titanate that had been formed by spraying an aqueous slurry of finely divided barium titanate onto a substrate and then drying. The alloy paste, which covered an area of 1 cm. in diameter, was dried, then covered with a second layer of titanate slurry and the process repeated until the desired number of alternate layers of dielectric and electrode were built up. As is well known in such capacitor construction, alternate electrodes are exposed on opposite sides of the capacitor structure. The composite structure was then fired at 1350–1450° C. for one hour. Leads were attached to the exposed electrode layers at opposite sides of the fired capacitor by silvering with a silver paste and again fired at 760° C. and then soldered. FIGURES 3 and 4 illustrate a capacitor constructed by this method. The capacitance of the capacitor was 10,000 picofarads per layer and the dissipation factor was less than 2%. This indicates that the alloy metalizing composition formed a continuous conductive layer reasonably free from voids.

A similar experiment with an 80/20 mixture of pure palladium particles and pure silver particles (as distinguished from the alloy) in an equal amount of a 10% solution of ethycellulose in butyl Cellosolve acetate proved itself to be substantially useless as a capacitor electrode metalizing composition when fired to a high temperature (over 1200° C.) At any temperature equal to or higher than the melting point of silver (about 960° C.), the melted silver, as a result of its surface tension, draws into tiny globules with the result that an undesirable non-continuous metallic electrode is obtained.

*Example 10*

A metalizing composition consisting of 50 parts of a gold-palladium alloy containing 20% gold mixed with 50 parts of a 10% solution of ethylcellulose in butyl Cellosolve acetate was used in conjunction with a barium titanate slurry similarly as in the two examples immediately above to form a capacitor. The composite structure was fired at about 1400° C. for one hour. On testing, the capacitor showed a capacitance of 7,000 picofarads per layer and the dissipation factor was about 2%.

*Example 11*

Still another capacitor was made in accordance with the procedure of Example 9, but using a metalizing composition consisting of 50 parts of a gold-platinum alloy containing 15% gold in 50 parts of a 10% solution of ethylcellulose in butyl Cellosolve acetate. This capacitor was formed using a firing temperature of 1400° C. for one hour. It exhibited a capacitance of 8,000 picofarads per layer and a dissipation factor of about 2%.

Inasmuch as the metalizing compositions employed in the manufacture of capacitors need not be soldered and are maintained in place by the dielectric substrates in contact therewith, the noble metal alloy may contain from 5% to 95% of either metal.

In preparing silver-palladium alloys which are to be used in metalizing compositions which are to be fired at temperatures about 1300° C., the ratio of silver-palladium in the alloy powder should be between 5 to 40% silver and 95 to 60% palladium. At 40% by weight of silver, the alloy has a melting point near 1320° C. Metalizing compositions of 30 to 60% of these silver-palladium alloy powders of a particle size not exceeding 5 microns and preferably of an average particle size of 0.1 to 0.5 micron, dispersed in 70 to 40% of an inert liquid organic vehicle can be applied by screen-stencilling most readily and result in excellent capacitors.

All percentages, parts and proportions of ingredients of materials set forth in the specification above and claims which follow, unless otherwise stated, are percentages, parts and proportions by weight.

Having described various embodiments of the invention, for purposes of illustration rather than limitation, what is claimed is as follows:

I claim:

1. A noble metal alloy metalizing composition suitable for use in the formation of capacitor electrodes comprising 30–90% solids content which comprises a noble metal alloy powder having particles of an irregular shape with at least 90% of said alloy particles being of a size not greater than 5 microns, and wherein the alloy powder consists essentially of two noble metals selected from the group consisting of silver, gold, platinum and palladium with one of the metals of the alloy being present therein in an amount within the range of from 5–95%, said solids being dispersed in 10–70% of an inert liquid organic vehicle.

2. The metalizing composition of claim 1 wherein the particle size of the alloy powder does not exceed about 5 microns.

3. The metalizing composition of claim 2 wherein the average particle size of the alloy powder is within the range of 0.1 to 0.5 micron.

4. The metalizing composition of claim 1 further comprising a vitreous binder wherein the vitreous binder powder is present in an amount within the range of 2.5 to 95% of the combined weight of alloy powder and vitreous binder.

5. The metalizing composition of claim 4 suitable for use in the production of solderable conductors wherein one of the metals of the alloy powder is present in the alloy in an amount within the range of about 87.5% and 12.5% and wherein the vitreous binder constitutes in excess of about 5% of the combined amount of alloy powder and vitreous binder.

6. The metalizing composition of claim 4 wherein the noble metal alloy is platinum-gold wherein the amount of platinum in the alloy is within the range of 15 to 85% and wherein the vitreous binder constitutes from 5 to 30% of the combined weight of the alloy powder and vitreous binder.

7. The metalizing composition of claim 4 wherein the noble metal alloy powder is platinum-palladium and wherein the amount of platinum in the alloy is within the range of 10 to 85% and wherein the vitreous binder constitutes from 5 to 30% of the combined weight of the alloy powder and vitreous binder.

8. The metalizing composition of claim 4 wherein the noble metal alloy powder is platinum-silver wherein the amount of platinum present in the alloy is within the range of 15 to 85% and wherein the vitreous binder constitutes from 5 to 30% of the combined weight of the alloy powder and vitreous binder.

9. The metalizing composition of claim 4 wherein the noble metal alloy powder is palladium-gold wherein the amount of palladium present in the alloy is within the range of 10 to 85% and wherein the vitreous binder constitutes from 5 to 25% of the combined weight of the alloy powder and vitreous binder.

10. The metalizing composition of claim 4 wherein the noble metal alloy powder is palladium-silver wherein the amount of palladium present in the alloy is within the range of 10 to 85% and wherein the vitreous binder constitutes from 5 to 20% of the combined weight of the alloy powder and vitreous binder.

11. A palladium-silver alloy metalizing composition suitable for use in the formation of capacitor electrodes comprising 30 to 60% of a palladium-silver powder of a particle size not exceeding about 5 microns and containing 5 to 40% silver and 95 to 60% palladium dispersed in 70 to 40% of an inert liquid organic vehicle.

12. A palladium-silver alloy metalizing composition suitable for use in the formation of capacitor electrodes comprising 30 to 60% of a precipitated palladium-silver alloy powder having an average particle size of 0.1 to 0.5 micron and containing 5 to 40% silver and 95 to 60% palladium dispersed in 70 to 40% of an inert liquid organic vehicle.

References Cited

UNITED STATES PATENTS

| | | | |
|---|---|---|---|
| 2,950,996 | 8/1960 | Place et al. | 252—514 XR |
| 3,172,753 | 3/1965 | Walsh | 75—.55 XR |
| 1,165,448 | 12/1915 | Richter | 75—172 |
| 2,129,721 | 9/1938 | Wise | 75—172 |
| 2,694,016 | 11/1954 | Craven et al. | 117—227 |
| 2,793,273 | 5/1957 | Underwood et al. | 252—514 |
| 2,924,540 | 2/1960 | D'Andrea | 252—514 X |

MURRAY KATZ, *Primary Examiner.*

LEON D. ROSDOL, *Examiner.*

J. D. WELSH, *Assistant Examiner.*

UNITED STATES PATENT OFFICE
CERTIFICATE OF CORRECTION

Patent No. 3,385,799                                      May 28, 1968

Lewis C. Hoffman

It is certified that error appears in the above identified patent and that said Letters Patent are hereby corrected as shown below:

Column 3, line 49, "relaive" should read -- relative --. Column 4, line 69, "terpinelo" should read -- terpineol --. Column 5, line 17, "perified" should read -- prefired --; line 21, "of" should read -- on --; line 22, "viterous" should read -- vitreous --. Column 6, line 32, "aalloy" should read -- alloy --. Column 9, line 5, "64.5" should read -- 63.5 --. Column 12, line 8, after "powder" insert -- having an irregular shape and --; line 16, after "having" insert -- an irregular shape and --.

Signed and sealed this 25th day of November 1969.

(SEAL)
Attest:

Edward M. Fletcher, Jr.                               WILLIAM E. SCHUYLER, JR.
Attesting Officer                                          Commissioner of Patents